May 5, 1964 S. GESSNER ET AL 3,131,917

DEVICE FOR ADJUSTING THE SPATIAL POSITION OF ARTICLES TO BE TREATED IN A TREATMENT CHAMBER

Filed Sept. 4, 1959 2 Sheets-Sheet 1

INVENTORS
Siegfried Gessner
Fritz Grzesnick

BY Watson, Cole, Grindle & Watson
ATTORNEYS

Inventors
Siegfried Gessner
Fritz Grasenick
By
Watson, Cole, Grindle & Watson
Attys.

3,131,917

DEVICE FOR ADJUSTING THE SPATIAL POSITION OF ARTICLES TO BE TREATED IN A TREATMENT CHAMBER

Siegfried Gessner and Fritz Grasenick, both of 12 Rechbauerstrasse, Graz, Austria Filed Sept. 4, 1959, Ser. No. 838,369
Claims priority, application Austria Sept. 9, 1958
3 Claims. (Cl. 263—7)

In many branches of technology it is frequently necessary to treat various articles under different conditions of pressure, temperature, and composition of the surrounding atmosphere. In many cases the articles to be treated have either to be kept in motion during treatment or their position in space must be altered continuously or from time to time.

Examples for such treating processes are e.g. the vapor plating of articles in high vacuum for the vapor preparation of objects for ultra-microscopical investigations, the coating of metals and non-metals with reinforcing or other layers, the manufacture of rheostats etc.

Other examples for treating processes of the above-named kind which may be carried out by aid of the apparatus set forth in the following description are the treatment of articles with corpuscular or electron rays or with other sorts of radiation e.g. with X-rays or ultra-violet rays for a great plurality of technical and scientific purposes.

Drying by deep-cooling is another example of such a process.

In connection with the last-named example it must be pointed out that those treatment processes are of special importance which occur at very low temperatures and (or) which have to be conducted under most severe conditions of purity e.g. in the manufacture of thin layers for electrical purposes (e.g. rheostats), the electrical properties of which are extremely sensitive against contaminations.

From the aforesaid it can be seen that it is of utmost importance to carry out such critical operations including the movement or turning of the objects to be treated without any substantial alteration of the prevailing critical conditions.

It is one object of the present invention to provide an arrangement by aid of which the described critical requirements can be met. According to the invention a thermally insulating treatment chamber containing means for the adjustment of the spatial position of the articles to be treated comprises a thermally insulating casing preferably in the form of a double-walled container and (or) a system of tubes which may be optionally constructed as cooling or heating device, said casing surrounding a vertical-lift arrangement with which a plate-shape object carrier mounting support is flexibly connected. Said carrier is so arranged as to be able to rotate at least around two of its space axes preferably around the vertical axis to the plane of support and around a axis which lies in said plane of support. An adjusting mechanism for shifting the vertical-lift arrangement and for rotating the object mounting support is so arranged as to lead out of the treatment chamber.

Figure 1:
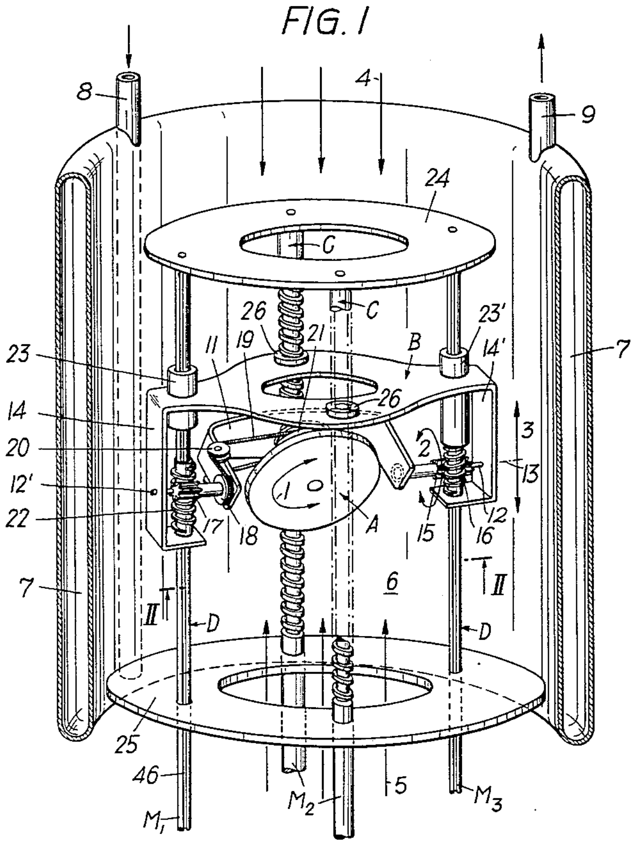
Figure 2:
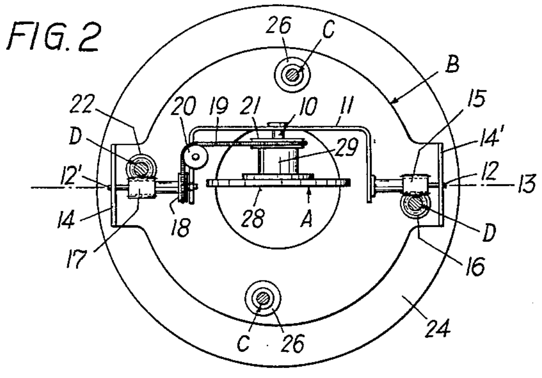
Figure 3:
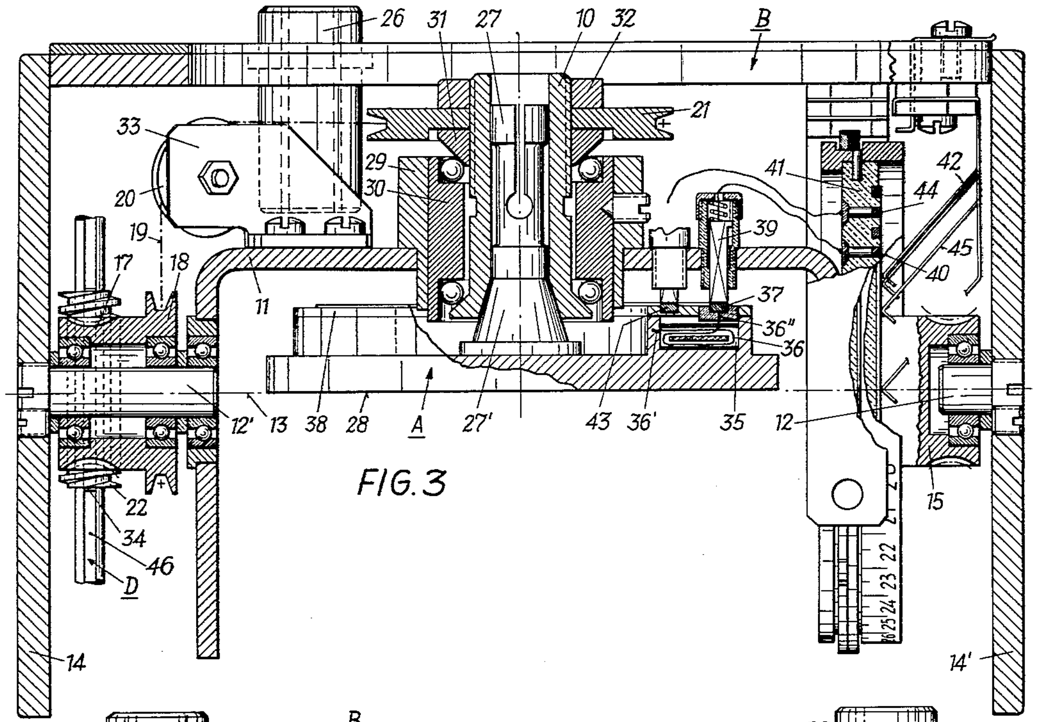
Figure 4:
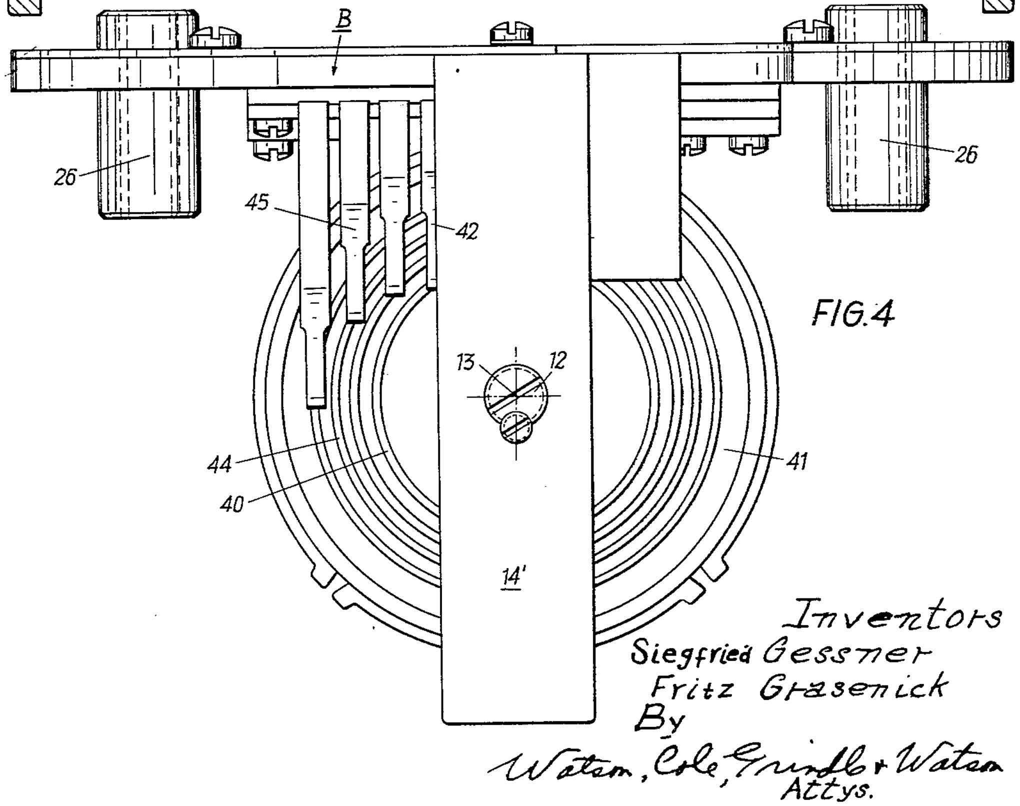

Further objects will be apparent from the following description when considered in connection with the accompanying drawing in which:

FIG. 1 is a diagrammatic perspective view partly in section with certain parts broken away in order to show various details, FIG. 2 is a cross section taken on line 2—2 of FIG. 1 in the direction of the arrows, FIG. 3 is a longitudinal sectional view of a part of the apparatus on a greatly enlarged scale including also the heating and driving means, and FIG. 4 is a side elevation as seen from the right-hand end in FIG. 3.

The treatment chamber 6 is enclosed by a thermally insulated double-walled cylinder E having a space 7 therein between the two walls which may be evacuated or which may be filled with a cooling fluid, such as air, or any other heat transfer medium. In order to supply liquid for the cooling medium, there are provided two pipe connections 8 and 9 in which FIG. 1 indicates by means of the arrows the inlet pipe 8 and the outlet pipe 9, both being in communication with the internal space 7 of the cylinder E. The double-walled cylinder E, which is a cooling cylinder, may be provided in an evacuated container which is not shown and the thermally insulating and vacuum-tight bushings in the wall of the container may be provided of any usual and well-known type.

The moving device consists of a lifting arrangement B which is pivoted and vertically movable on lifting and driving spindles C and D respectively. With this lifting arrangement an object mounting support or a plate-shaped object carrier A is flexibly connected so that it can rotate around one of its plane axes and on the other hand around an axis vertically to the plane area and preferably intersecting the center thereof. The possibility of simultaneous and independent movement in the indicated directions allows a threefold infinite variety of possible positions in the space for the objects resting on the mounting support. The possible directions of motion are indicated in the drawing by arrows 1, 2 and 3. The construction and operating mechanism will now be described referring to FIGS. 1 and 2 of the drawing and which will be noted that these figures show mounting support or plate A which by means of an axle 10 is rotatably mounted in a bow or stirrup member 11, as seen in FIG. 2. On the right-hand side of the stirrup 11, there is provided and secured thereto a stub axle 12 and on the left-hand side there is provided a stub axle 12', thus providing a rotatable mounting means. Both stub axles 12 and 12' are axially aligned with one another and form the oscillating axis 13 for the stirrup 11 which is in a plane with the operating surface of the mounting support A. Both stub axles 12 and 12' are mounted with their outer ends in the two depending projecting lugs 14 and 14' of an elevating member B. The stub axle 12 is provided with a pinion 15 rotatably mounted thereon which is in mechanical communication with the driving spindle D at the right-hand side, FIG. 1, by means for a worm gear 16 securely mounted thereon. The stub axle 12' also has a pinion 17 rotatably mounted thereon and also a pulley 18 secured to the pinion in order to drive the mounting support A by means of the pulley 18 interconnected with an elastic belt 19 which, for example, may be composed of a spiral spring member and the latter passing partially around two idler pulleys 20 and also passing partially around the driving pulley 21 of the mounting support A. The pinion 17 meshes with a worm gear 22 which is constructed in a like manner as the worm gear 16 and the worm gear 22 being securely mounted to rotate with and on the left-hand spindle D. Both spindles D pass through the elevating member B by means of bearing bushings 23 and 23'.

In order to provide for the raising and lowering movement of the element B and the mounting support A, there are provided two actuating spindles C mounted in and between two holding ring members 24 and 25 and each spindle is provided with a spiral thread meshing with a threaded bushing 26 secured in the member B. Upon the simultaneous rotation of both spindles C, as for example, by means of an electric motor, not shown, connected to the shaft parts $M_2$, it is possible to raise or lower the member B in the direction of the arrows as shown in FIG. 1, whereby both of the worm gears 16 and 22 will be axially displaced on the driving spindles D together with such spindles.

Upon the rotation of the right-hand driving spindle D, as for example, with the aid of an electric motor, not shown, connected to the shaft $M_3$, the worm gear 16 and the pinion 15 will be actuated so that the stirrup 11, together with the mounting support A, will be swung around the axes 13 in accordance with the arrow 2. If the left-hand spindle D is rotated alone by the aid of an electric motor, not shown, connected to the shaft $M_1$, worm gear 22 and the gear 17 as well as the pulley 18 will be actuated. The rotation of the pulley 18 will result in driving and rotating the pulley 21 by means of the elastic belt 19 and thus the support plate A will be rotated in the direction of rotation as indicated by the arrow 1 in FIG. 1.

It is, of course, possible to provide an operation of the apparatus in such manner that both spindles C and D are rotated at the same time and dependent upon the direction of rotation of the spindles, it is possible to adjust the parts in one or the other direction.

The mechanism for carrying out the operation of the various elements is clearly shown in FIGS. 3 and 4 in more detail and in which like reference characters indicate corresponding parts. The support plate A has a central elastic extension 27 secured thereon so that it can be mounted in the axle 10 as shown in FIG. 3. A cone-shaped member 27' will assure the correct axial position of the mounting support A so that the surface 28 of the mounting support A will be maintained in the oscillating axis 13. The axle 10 is mounted by means of a bushing 29 in the radial and axial means in the stirrup 11 and for this purpose there is provided a double ball bearing 30 so that the driving pulley 21 can be secured on the axle 10 mounted thereon by means of supporting rings 21 and 32 which are secured by screw-threaded action on the axle 10. The stub axle 12' has the pinion 17 mounted thereon by ball bearings and this latter is integral and rotates with the pulley 18. The stub axle 12' is also mounted in the depending arm 14 of the element B and is secured against movement therein. The other end of the stub axle 12' forms a bearing member for the stirrup 11 and it will be noted that at the right-hand end of the member B, FIG. 3, the stub axle 12 is mounted in the same manner as the stub axle 12' in the depending member 14'. Also, on the right-hand side the pinion 15 is secured to the stirrup 11.

In order to drive the pulley 21 by means of the elastic belt 19 by means of two idler pulleys 20 mounted on the bracket 33, it will be noted that the belt 19 is shown in FIG. 3 with a dot-and-dash line. The two worm gears, of which only the left-hand gear is to be seen, are axially movable with the drive spindle D by means of a key member 34 which slides in a groove 46 in the driving spindle.

In order to heat the support member A, there is provided a ring groove therein which between insulating layers supports an electric heating wire or element 36, having one end 36' connected to the support A and the other end 36'' connected to a metallic contact ring 37 which is mounted in insulation in the cover 38. By means of an electrically insulated spring contact member 39, the contact ring 37 will be in electrical connection with a contact ring 40 which is mounted securely on the stirrup by means of an insulating disk 41, as shown in FIGS. 3 and 4. Thus, the current will flow through the spring contact member 42 which is electrically insulated in the support member B. In a similar manner, the electrical connections for the end 36' of the heating element is connected by means of a slide ring 43 which is in contact with a slide ring 44 in the insulating disk

41. A contact tongue member 45 connects the slide ring 44 with a second electrically insulated element on the stirrup B. In order to convey the electric cable to the apparatus, any suitable flexible cable can be connected to contact connections mounted on the support B. The extent of variation of the positions in space may be restricted by aid of suitable control mechanisms, if e.g. periodical movements are to be carried out around one or both rotation axes. The movement may e.g. be so controlled that the mounting support A performs a predetermined program in a certain range of angle of the movement 2, said range of angle optionally being turned into another position in space. This kind of control is especially useful if an object is to be exposed to different kinds of radiation without alteration of the experimental conditions, e.g. to atomic rays and to electron rays. The point of entrance of the treating medium is indicated by arrows 4 and 5, respectively.

In the device according to the invention in addition to the heating devices also temperature measuring devices can be arranged and optionally be connected with each other.

By aid of the apparatus described it is possible to conduct operations continuously and without interruption which heretofore had to be carried out separately. The treatment is uniform and reproducible in an extent which was not possible with known arrangements of this kind. In the heretofore used devices the object could only be rotated in one single direction so that it was not possible e.g. to coat by vapor plating all parts of the surface of an object uniformly, independent from their different positions in space. By aid of the method and apparatus according to the invention, such a task can be performed with a high degree of perfection.

During all movements of the device according to the invention the thermal insulation of the chambers in which these movements occur is maintained unaltered. In that embodiment of the invention in which the thermally insulating chamber is a cooling cylinder, the device can be so operated that the mounting support for the objects to be treated is heated alone and independently from the cooling cylinder. In this case the walls of the cooling cylinder have the lowest temperature in the system and thus act as cooling traps for residual gases, vapors, or contamination of other kind.

At will be obvious to those skilled in the art, many variations in the described device are possible without departing from the scope and spirit of the invention. Thus, the thermally insulating double-wall container could be replaced by a system of concentrical tubes etc. whereby care is only to be taken that the article or object to be treated is surrounded as completely as possible from this cotnainer etc. Openings can be provided in the side walls of the container etc. e.g. for the insertion of the mentioned movement or driving arrangements. The movement devices may be driven electromechanically by three motors $M_1$, $M_2$, $M_3$, but also magnetically or in any other manner (preset course etc.).

We claim:

1. A device for adjusting the spatial position of articles to be treated in a thermally insulating treatment chamber, comprising a lifting arrangement and a mounting support rotatably secured thereto, said support being controlled and rotatable simultaneously around at least two of its spatial axes during operation, a driving means for shifting the lifting arrangement and rotating the object mounting support during the treatment, said means including four spindles arranged parallel to each other and which support the lifting arrangement and project with one end in the treatment chamber in which the spindles are rotatable, said means including means to rotate the spindles so that two of said four spindles will raise and lower the support and the other two of said four spindles connected to be operative so that one will swing the mounting support and the other will rotate the support.

2. A device according to claim 1, in which the mounting support includes a stirrup rotatable around an axis in the plane of the support.

3. A device according to claim 1, in which the mounting support includes a stirrup rotatable around an axis in the plane of the support, and in which heating means are provided in the mounting support to heat the articles to be treated thereon.

References Cited in the file of this patent

UNITED STATES PATENTS

| | | |
|---|---|---|
| 1,036,441 | Buck | Aug. 20, 1912 |
| 1,738,991 | Fink et al. | Dec. 10, 1929 |
| 2,351,537 | Osterberg et al. | June 13, 1944 |
| 2,488,296 | Kraus | Nov. 15, 1949 |
| 2,532,971 | Van Leer et al. | Dec. 5, 1950 |
| 2,783,531 | Eisler | Mar. 5, 1957 |
| 2,835,964 | Yarwood | May 27, 1958 |

FOREIGN PATENTS

| | | |
|---|---|---|
| 276,390 | Great Britain | Aug. 23, 1927 |
| 966,014 | Germany | July 4, 1957 |